United States Patent [19]

Habu

[11] 4,005,684
[45] Feb. 1, 1977

[54] INTERNAL COMBUSTION ENGINE

[75] Inventor: Nobuo Habu, Shizuoka, Japan

[73] Assignee: Toyota Jidosha Kogyo Kabushiki Kaisha, Toyota, Japan

[22] Filed: Mar. 26, 1975

[21] Appl. No.: 562,191

[30] Foreign Application Priority Data

Aug. 8, 1974 Japan ............... 49-94788[U]

[52] U.S. Cl. .................. 123/30 D; 123/32 SP; 123/193 P
[51] Int. Cl.[2] ................................. F02B 3/00
[58] Field of Search ...... 123/32 SP, 32 ST, 191 SP, 123/193 P, 193 CP, 32 B, 32 C

[56] References Cited

UNITED STATES PATENTS

| | | | |
|---|---|---|---|
| 2,935,054 | 5/1960 | Franke et al. | 123/32 B |
| 3,063,434 | 11/1962 | Haas | 123/32 SP |
| 3,105,470 | 10/1963 | Hockel et al. | 123/32 B |
| 3,766,900 | 10/1973 | Aiti | 123/193 P |

Primary Examiner—Wendell E. Burns
Assistant Examiner—David D. Reynolds
Attorney, Agent, or Firm—Stevens, Davis, Miller & Mosher

[57] ABSTRACT

An internal combustion engine of the type in which the combustion space is divided into a main combustion chamber and an auxiliary combustion chamber connected to each other by a communication passage, and an ignition plug and a fuel injection nozzle are provided for the auxiliary combustion chamber so that the flame produced by the ignition and combustion of a rich fuel-air mixture in the auxiliary combustion chamber spreads into the main combustion chamber to cause effective secondary combustion of the fuel-air mixture in the main combustion chamber; the upper surface of the piston crown is inclined gradually downward and toward the opposite side from the peripheral edge which is brought to a position adjacent to the communication passage when the piston reaches the top dead center, and a stepped portion located remote from the communication passage and a vertical wall having a configuration consisting of a pair of curved surfaces is formed on the surface of the piston crown as the inner wall of the stepped portion.

9 Claims, 3 Drawing Figures

INTERNAL COMBUSTION ENGINE

BACKGROUND OF THE INVENTION

This invention relates to an internal combustion engine of the type provided with an auxiliary combustion chamber in addition to a main combustion chamber, and more particularly to a gasoline injection internal combustion engine of the above type for automotive vehicles which can operate with an improved rate of fuel consumption, while, at the same time, attaining the purification of exhaust gases.

In an internal combustion engine of the type provided with an auxiliary combustion chamber in addition to a main combustion chamber, fuel is injected directly into the auxiliary combustion chamber to form a rich fuel-air mixture in the auxiliary combustion chamber, and a portion of the fuel passing from the auxiliary combustion chamber into the main combustion chamber is utilized to form a lean fuel-air mixture in the main combustion chamber so as to attain the so-called stratified charge combustion in which the fuel is subjected to primary and secondary combustion. While this stratified charge combustion is advantageous in reducing the amount of nitrogen oxides (NOx) among harmful components of engine exhaust gases, it has also the disadvantage of increasing the amounts of unburnt hydrocarbons (HC) and carbon monoxide (CO) due to the fact that the rich fuel-air mixture is formed and ignited in the auxiliary combustion chamber.

An internal combustion engine is known in which the combustion space is divided into a main combustion chamber and an auxiliary combustion chamber, and an intake valve and an exhaust valve are disposed in the main combustion chamber. In this engine, the main combustion chamber is connected to the auxiliary combustion chamber by a communication passage, and an ignition plug and a fuel injection nozzle are provided for the auxiliary combustion chamber, and a rich fuel-air mixture is produced in the auxiliary combustion chamber and initially ignited, and then the flame thus produced is utilized for causing secondary combustion of the fuel-air mixture in the main combustion chamber. In such an engine, air must be supplied from the main combustion chamber into the auxiliary combustion chamber without being extremely restricted by the communication passage, and the flame produced in the auxiliary combustion chamber must quickly spread throughout the main combustion chamber so as to ensure effective secondary combustion of the fuel-air mixture in the main combustion chamber.

SUMMARY OF THE INVENTION

It is therefore a primary object of the present invention to provide an internal combustion engine of the type above described which is uniquely designed to meet the above demand and which has the ability to discharge satisfactorily purified exhaust gases and can operate with an improved rate of fuel consumption.

In accordance with the present invention, there is provided an internal combustion engine with an auxiliary combustion chamber comprising a main combustion chamber defined by the inner surface of a cylinder bore and the upper surface of a crown of a piston disposed in the cylinder bore for reciprocating movement therein, an auxiliary combustion chamber formed in the cylinder head at a position above the main combustion chamber and having a spark plug and a fuel injection nozzle associated therewith, a communication passage being formed in the cylinder head and extending from an upper end of the main combustion chamber to the auxiliary combustion chamber for providing communication between the main and auxiliary combustion chamber, wherein the upper surface of the crown of the piston is configured to have an inclined portion extending gradually downward from the upper peripheral edge which is brought to a position adjacent to the communication passage (when said piston reaches the top dead center) toward the opposite side edge. This slope is partitioned by a pair of curved vertical walls such as two arcuate vertical walls, from the remaining portion of the upper surface of the crown. The remaining portion forms a stepped portion at the opposite side remote from the communication passage. The pair of vertical curved surfaces is joined to each other on a diameter of the piston, which diameter passes through the portion of the peripheral edge of the crown most adjacent to the communicating passage.

DESCRIPTION OF THE PREFERRED EMBODIMENT

Figure 1:
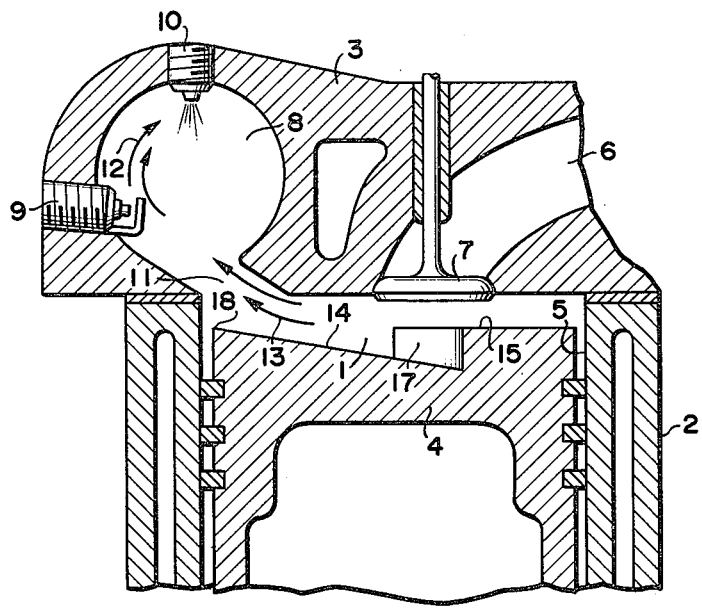
FIG. 1 is a longitudinal sectional view of a part of an embodiment of the internal combustion engine according to the present invention, wherein the sectional area of the crown of the piston is taken along the line I—1 in FIG. 2.
Figure 2:
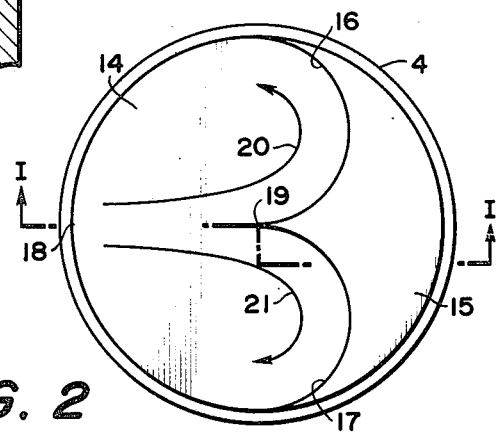
FIG. 2 is a plan view of the crown of the piston shown in FIG. 1.

Referring to FIGS. 1 and 2 showing an embodiment of the gasoline injection internal combustion engine according to the present invention, a main combustion chamber 1 is defined by the inner surface of a cylinder bore 5 formed in a cylinder block 2, the upper surface of the crown 4 of the piston disposed in the cylinder bore 5 for reciprocating movement therein and the lower surface of a cylinder head 3. To simplify the disclosure, only one cylinder of the engine is illustrated. It will be clear, however, that any multiple of cylinders can be provided so long as they are constructed in the manner to be described.

The cylinder head 3 is rigidly secured to the cylinder block 2 by means of conventional means, such as bolts and the like in usual manner. The piston having the crown 4 is adapted to reciprocate vertically in the cylinder bore 5 and is connected to an engine crankshaft (not shown) by any suitable means. The cylinder head 3 is formed with an intake port 6 and an exhaust port (not shown). The intake port 6 is openably closed by an intake valve 7 disposed in the cylinder head 3 for communication with the main combustion chamber 1 as well as the exhaust port. An auxiliary combustion chamber 8 of suitable shape is formed in the cylinder head 3 at a position above the main combustion chamber 1. A spark plug 9 and a fuel injection nozzle 10 are associated with this auxiliary combustion chamber 8 as shown in FIG. 1. The spark plug 9 and the fuel injection nozzle 10 are of conventional types which are well known in the technical field of internal combustion engines. The auxiliary combustion chamber 8 communicates with the main combustion chamber 1 through a communication passage 11.

The volume of the auxiliary combustion chamber 5 is preferably limited to about 90% of the volume of the combustion space at the maximum in view of the structural demand that a suitable space must be present between the cylinder head 3 and the piston crown 4 even in the uppermost position of the piston and that a certain volume is required for the communication passage 11. The auxiliary combustion chamber 8 is configured to have a substantially hollow spherical, hollow cylindrical or any other suitable shape as well known, so that a swirl 12 of air flowing into the auxiliary combustion chamber 8 from the port 6 via the main combustion chamber 1 and the communication passage 11 is produced, and this swirling stream 12 may not be substantially attenuated. The communication passage 11 is arranged to extend in a direction to produce such swirling stream 12, which direction is preferably tangential to the chamber 8. The sectional area of the communication passage 11 is selected to be about 1 to 10% of the sectional area of the cylinder bore 5 so as to minimize an undesirable loss due to extreme restriction against air flow, and at the same time, to prevent fuel 13 injected into the auxiliary combustion chamber 8 from passing immediately into the main combustion chamber 1. The axis of the communication passage 11 is inclined to make a large angle with the axis of the cylinder bore 5 so that the flow of burning gases emerging from the auxiliary combustion chamber 8 may not impinge violently against the upper surface of the piston crown 4 and such burning gas flow can spread rapidly throughout the main combustion chamber 1. The spark plug 9 is disposed at a position which will not substantially adversely affect the swirling stream 12 produced in the auxiliary combustion chamber 8.

The upper surface of the piston crown 4 is configured to include an inclined surface or a slope 14 extending gradually downward from one side toward the opposite side to terminate at a pair of curved vertical walls 16 and 17. A raised or stepped portion 15 is formed at the opposite side. The upstanding vertical walls 16 and 17 of the stepped portion 15 define the boundary between the slope 14 and the stepped portion 15 has a surface configuration in the form of a pair of arcs. The starting end, i.e., the highest point 18 of the slope 14 diametrically opposite to the stepped portion 15, is located to be brought to a position adjacent to the opening of the communication passage 11 when the piston reaches the top dead center. The two curved surfaces formed by the arcs 16 and 17 to define the upstanding walls 16 and 17 of the stepped portion 15 join to each other at a point 19 which is diametrically opposite to the starting end 18 of the slope 14. The axis of the communication passage 11 is directed to the highest point 18.

In the engine having such a construction, air is solely drawn into the cylinder bore 5 through the intake port 6 in the suction stroke. Air drawn into the cylinder bore 5 is forced to flow into the auxiliary combustion chamber 8 through the communication passage 11 with the upward movement of the piston in the compression stroke to produce a positive and strong swirling stream of air in the auxiliary combustion chamber 8. Fuel is injected by the fuel injection nozzle 10 into the auxiliary combustion chamber 8 when the valve 7 is closed and during this compression stroke.

The fuel-air mixture is ignited to initiate combustion in the auxiliary combustion chamber 8. The burning gas flow jetted into the main combustion chamber 1 through the communication passage 11 spreads immediately into the air within the main combustion chamber 1 by being guided by the slope 14 of the piston crown 4 and is then guided by the two arcuate surfaces 16 and 17 to form swirling gas streams 20 and 21 in the main combustion chamber 1. As a result, the burning fuel-air mixture is positively mixed with the air in the main combustion chamber 1 to ensure secondary combustion of the burning gases. Therefore, harmful gas components including unburnt hydrocarbons (HC) and carbon monoxide (CO) contained in the burning fuel-air mixture from the auxiliary combustion chamber 8 can be reliably oxidized to be converted into harmless carbon dioxide ($CO_2$), so that objectionable discharge of harmful exhaust gas components from the engine can be substantially prevented.

Figure 3:
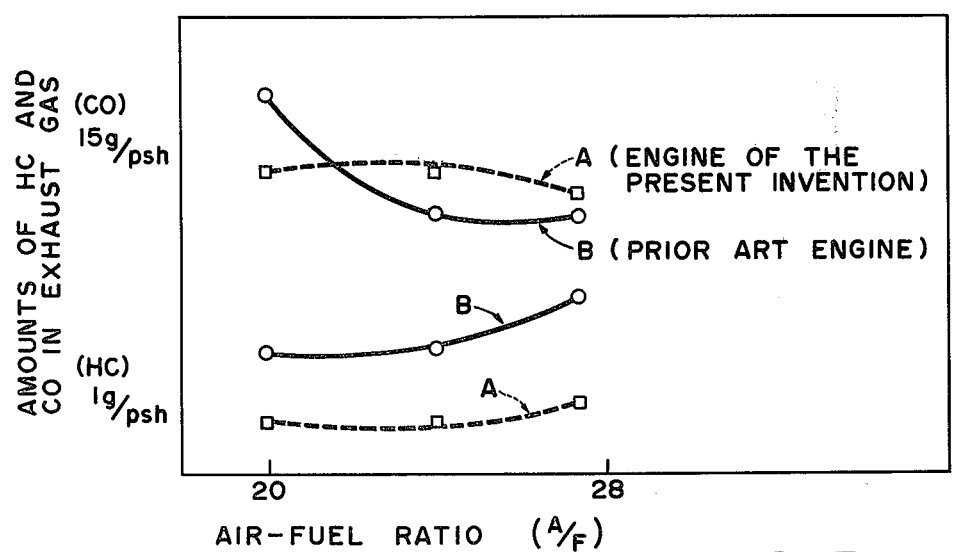
FIG. 3 is a graphic representation of the relationship between the air-fuel ratio and the amounts of harmful exhaust gas components in the engine of the present invention compared with the similar relation in a prior art engine of this type.

FIG. 3 is a graphic representation of the relationship between the air-fuel ratio and the amounts of harmful exhaust gas components CO and HC in the engine of the present invention compared with the similar relation in a prior art engine of this type. The curves A and B represent the results obtained with the engine of the present invention and the prior art engine, respectively. It will be readily seen from FIG. 3 that the amount of HC is remarkably reduced in the engine according to the present invention.

While the invention has been illustrated in its preferred embodiment, it will be clear those skilled in the arts to which the invention pertains that many modifications and changes can be made thereto without departing from the scope of the invention.

What is claimed is:

1. An internal combustion engine comprising a cylinder block having cylinder bores, a piston having a crown disposed reciprocably in each cylinder bore, a cylinder head secured onto the cylinder block, a main combustion chamber defined by the inner surface of the cylinder bore, the upper surface of the crown and the under surface of the cylinder head in each cylinder bore, an auxiliary combustion chamber formed in the cylinder head at a position above said main combustion chamber, a spark plug disposed in the cylinder head for the auxiliary combustion chamber, means for supplying fuel to said auxiliary combustion chamber, a communication passage formed in the cylinder head for fluidly communicating the main combustion chamber and the auxiliary combustion chamber, the upper surface of the crown of the piston having an entirely planar inclined portion extending gradually downward and toward the opposite side from the peripheral edge which is brought to a position adjacent to said communication passage when said piston reaches the top dead center position and a stepped portion formed at said opposite side remote from said communication passage, the inclined portion terminates at a pair of curved surfaces as the inner wall of the stepped portion, the curved surfaces being joined to each other at a point diametrically opposite to the highest point of the peripheral edge of the crown and extending away from each other to the peripheral edge of the crown.

2. An internal combustion engine as claimed in claim 1, wherein the curved surfaces are a pair of arcuate surfaces.

3. An internal combustion engine as claimed in claim 1, wherein the axis of the communication passage for fluidly communicating the main and auxiliary combustion chamber is inclined at a large angle relative to the axis of the cylinder bore.

4. An internal combustion engine as claimed in claim 1, wherein the axis of the communication passage is directed toward the joining point of the curved surfaces.

5. An internal combustion engine according to claim 1, wherein said fuel supplying means comprises a fuel injection nozzle in said auxiliary combustion chamber.

6. An internal combustion engine according to claim 3, wherein said spark plug has electrodes within said auxiliary combustion chamber so as to be disposed in the swirl flow therein.

7. An internal combustion engine according to claim 5, wherein said fuel injection nozzle is so disposed that said nozzle injects the fuel at a right angle relative to the direction of swirl flow.

8. An internal combustion engine according to claim 5, wherein:
said auxiliary combustion chamber is spherical and said nozzle injects fuel in a direction toward the center of the auxiliary combustion chamber.

9. An internal combustion engine comprising:
a cylinder block having cylinder bore defined therein;
a piston, having a crown, reciprocably disposed in said cylinder bore;
a cylinder head secured onto said cylinder block;
the inner surface of said bore, the upper surface of said crown and the undersurface of the cylinder head defining a main combustion chamber therebetween;
means defining an auxiliary combustion chamber in said cylinder head above said main combustion chamber;
a spark plug having an electrode in the auxiliary combustion chamber;
means for supplying fuel to said auxiliary combustion chamber;
means defining a passage in said cylinder head for fluidly communicating said main and auxiliary combustion chambers, one end of said passage opening directly into said main combustion chamber and the other end thereof opening directly into said auxiliary combustion chamber;
the upper surface of the crown of the piston comprises:
an entirely planar inclined portion which extends gradually downward, from a first portion of the peripheral edge thereof which is immediately below the passage when the piston is in the top dead center position, and toward the side of the piston opposite said first portion, and
a stepped portion, on said opposite side remote from said passage, comprising an inner wall comprising a pair of arcuate substantially vertically extending surfaces at the lower end of which the inclined portion terminates, said arcuate surfaces extending inwardly from diametrically opposite portions of the peripheral edge of the crown and terminating adjacent the center of the crown in a common edge.

* * * * *